United States Patent [19]

Marsden

[11] 4,288,295

[45] Sep. 8, 1981

[54] COKE OVEN WITH APPARATUS FOR PARTIALLY DRYING AND PREHEATING COAL

[75] Inventor: Brian W. H. Marsden, Palos Heights, Ill.

[73] Assignee: Interlake, Inc., Oak Brook, Ill.

[21] Appl. No.: 47,871

[22] Filed: Jun. 12, 1979

[51] Int. Cl.[3] .......................................... C10B 45/00
[52] U.S. Cl. ...................................... 202/150; 201/1; 432/173; 432/181
[58] Field of Search ...................... 201/39, 40, 41, 44, 201/1; 432/173, 181, 14, 17; 202/150; 34/54

[56] References Cited

U.S. PATENT DOCUMENTS

| | | | |
|---|---|---|---|
| 1,446,857 | 2/1923 | Peiter | 202/150 X |
| 2,552,014 | 5/1951 | Puening | 201/28 X |
| 2,658,862 | 11/1953 | Horner | 202/150 X |
| 3,047,473 | 7/1962 | Schmidt | 201/40 X |
| 3,374,151 | 3/1968 | Schmidt | 201/40 X |
| 3,523,065 | 8/1970 | Schmidt | 201/40 |
| 3,825,405 | 7/1974 | Suga | 34/54 X |
| 3,992,266 | 11/1976 | Aktay et al. | 201/41 X |
| 4,008,042 | 2/1977 | Auvil et al. | 34/13 |
| 4,030,983 | 6/1977 | Beck et al. | 201/40 |
| 4,053,364 | 10/1977 | Poersch et al. | 202/150 |
| 4,102,635 | 7/1978 | Beck | 432/14 |
| 4,176,011 | 11/1979 | Knappstein | 201/40 |

FOREIGN PATENT DOCUMENTS

| | | | |
|---|---|---|---|
| 2715536 | 10/1978 | Fed. Rep. of Germany | 201/41 |
| 2733365 | 2/1979 | Fed. Rep. of Germany | 201/41 |
| 2738280 | 3/1979 | Fed. Rep. of Germany | 201/41 |

OTHER PUBLICATIONS

Link Belt Catalogue, 1941, pp. 18-19.

Primary Examiner—Frank W. Lutter
Assistant Examiner—Roger F. Phillips
Attorney, Agent, or Firm—Vogel, Dithmar, Stotland, Stratman & Levy

[57] ABSTRACT

A coking oven having a coking chamber and a combustion chamber with a high temperature flue gas outlet connected to a first heat exchanger for heating cool air to cool the flue gases to an intermediate temperature, a coal dryer using the intermediate temperature flue gases for drying wet coal to a water content of a few percent by weight and preheating the coal to a temperature below the boiling point of water, a coal oiler to oil the partially dried and preheated coal, and a gas cleaner system for removing particulate matter from the low temperature flue gas coming from the coal dryer; also disclosed is an improved method of coking coal and apparatus for preheating and partially drying coal that can be added to existing coke oven structures.

11 Claims, 5 Drawing Figures

COKE OVEN WITH APPARATUS FOR PARTIALLY DRYING AND PREHEATING COAL

PRIOR ART STATEMENT AND BACKGROUND OF THE INVENTION

The present invention relates generally to improvements in coking ovens and specifically to the provision of apparatus for partially drying and preheating wet coal before feeding thereof to the coking oven utilizing intermediate temperature flue gases that have heretofore been used to preheat the combustion air for the coke oven, thereby to produce coke with a high stability index at a fuel savings with high coking productivity.

Coking systems have been provided heretofore utilizing flue gases to preheat the coal being fed through the coke ovens, and examples thereof are illustrated in U.S. Pat. No. 1,827,483 granted Oct. 13, 1931 to S. W. Parr et al.; U.S. Pat. No. 1,899,887 granted Feb. 28, 1933 to E. W. Thiele; U.S. Pat. No. 2,552,014 granted May 8, 1951 to F. Puening; and U.S. Pat. No. 3,013,951 granted Dec. 19, 1961 to V. Mansfield.

The Parr et al. U.S. Pat. No. 1,827,483 and the Thiele U.S. Pat. No. 1,899,887 both use high temperature flue gases directly from the coking retort, or from burning a portion of the coke, to preheat the incoming coal to a high temperature which will render the coke bone-dry and almost at the plastic stage thereof. Coal that has been heated to a bone-dry condition presents an explosion hazard due to the extremely fine coal dust that is accompanied thereby. Furthermore, coal at these high temperatures is hard to handle since the individual pieces of coal tend to cling to each other and to the walls of containers and devices used to convey the dried coal to the coke oven. In the present invention, the high temperature flue gases directly from the coking operation are first used to preheat the air for the combustion chamber thus reducing the flue gases to an intermediate temperature, and the flue gases at the intermediate temperature are then used to partially dry the coal to a water content from about 2% to about 5% by weight and to a temperature in the range from about 130° F. to about 190° F. This eliminates the explosion hazard from dry coal dust and also eliminates any tendency of the preheated coal to cling one piece to the other and to the walls of containers and devices used to convey the partially dried coal to the coke oven.

The Puening U.S. Pat. No. 2,552,014 shows a three-stage coal preheater which heats the coal to a bone-dry condition at a temperature of about 500° F. As has been pointed out above, coal that has been heated to a bone-dry condition presents an explosion hazard due to the extremely fine coal dust that is accompanied thereby. Furthermore, coal at a high temperature is hard to handle since the individual pieces of coal tend to cling to each other and to the walls of containers and devices used to convey the dried coal to the coke oven. By contrast, the present apparatus and method heats the coal to a partially dried condition at a moderate temperature so as to overcome these problems.

The Mansfield U.S. Pat. No. 3,013,951 shows a continuous coking apparatus wherein flue gases are used directly to preheat the coal to a bone-dry condition at a temperature of 350° F. to 450° F. Coal thus heated to a bone-dry condition presents an explosion hazard due to the extremely fine coal dust that accompanies such dried coal. Furthermore, coal at these high temperatures is hard to handle since the individual pieces of coal tend to cling to each other and to the walls of containers and devices used to convey the dried coal to the coke oven. The apparatus and method of the present invention overcomes these problems by only partially drying the coal and heating the coal to a low temperature no greater than about 190° F. so that there is no tendency of the coal to cling to the walls of containers and devices used to convey the dried coal to the coke oven.

There is reported in an article entitled "Heat Drying Coals at Moderate Temperatures Before Coking" by H. W. Jackman and R. J. Helfinstine, Circular No. 449, dated 1970, issued by the Illinois State Geological Survey, a report of the effect of drying coals on the coking thereof. There is no suggestion in this article, however, of utilizing intermediate temperature flue gasses from a coking oven to partially dry and preheat coal as taught in the present invention.

SUMMARY OF THE INVENTION

The present invention provides apparatus for partially drying and preheating wet coal before feeding thereof to a coking oven utilizing intermediate temperature flue gases that have heretofore been used to preheat the combustion air for the coke oven, thereby to produce coke with a high stability index at a fuel savings with high coking productivity.

This is accomplished in the present invention, and it is an object of the present invention to accomplish these desired results, by providing a coke oven having a coking chamber and a combustion chamber in heat transfer relation to the coking chamber and having a fuel inlet and a heated air inlet and a high temperature flue gas outlet, a first heat exchanger associated with the combustion chamber including a cold air inlet and a heated air outlet communicating with the heated air inlet and a high temperature flue gas inlet communicating with the high temperature flue gas outlet and an intermediate temperature flue gas outlet, the first heat exchanger heating the inlet air using the energy in the high temperature flue gases to provide heated air for the combustion chamber and cooling the high temperature flue gases to an intermediate temperature, a chimney having the lower end thereof connected by a first pipe to the intermediate temperature flue gas outlet, a coal dryer having an inlet for wet coal and an outlet for partially dried and preheated coal and an inlet for intermediate temperature flue gases and an outlet for low temperature flue gases, a second pipe interconnecting the first pipe and the inlet for intermediate temperature flue gases, valve mechanism associated with the first and second pipes for diverting at least a portion of the intermediate temperature flue gases to the coal dryer, the flue gases in the coal dryer being in heat exchange relation with the wet coal in the coal dryer partially to dry the coal to a water content of a few percent by weight and to preheat the coal to a temperature below the boiling point of water.

Another object of the invention is to provide a coke oven of the type set forth having a coal oiler with the input thereto in communication with the outlet of the coal dryer from which issues the partially dried and preheated coal and serving to produce oiled coal having the correct bulk density and flowability and consistency.

Yet another object of the invention is to provide in a coke oven of the type set forth a gas cleaner system for removing particulate matter from the low temperature flue gases and having an inlet connected to the coal dryer outlet for low temperature flue gases and an outlet communicating with the atmosphere.

Still another object of the invention is to provide in a coke oven of the type set forth a supplemental heater in heat exchange relationship with the intermediate temperature flue gases in the second pipe for increasing the temperature of the intermediate temperature flue gases when the moisture content of the wet coal in the coal inlet to the coal dryer is above about 8% by weight.

Yet another object of the invention is to provide apparatus for preheating and partially drying coal of the type set forth useful in retrofitting existing coke ovens to provide the advantages of the present invention therefor.

A further object of the invention is to provide a method of coking coal that includes placing the intermediate temperature flue gases from a heat exchanger in heat exchange relationship to wet coal being fed to the coking chamber partially to dry the coal to a water content of a few percent by weight and to preheat the coal to a temperature below the boiling point of water and to cool the intermediate flue gases to a low temperature.

Further features of the invention pertain to the particular arrangement of the parts of the coke oven, and the apparatus for preheating and partially drying the coal, and to the steps of the method, whereby the above outlined and additional operating features thereof are attained.

The invention, both as to its organization and the method of operation, together with further features and advantages thereof, will best be understood with reference to the following specification taken in connection with the accompanying drawings.

DESCRIPTION OF THE PREFERRED EMBODIMENTS

Figure 1:
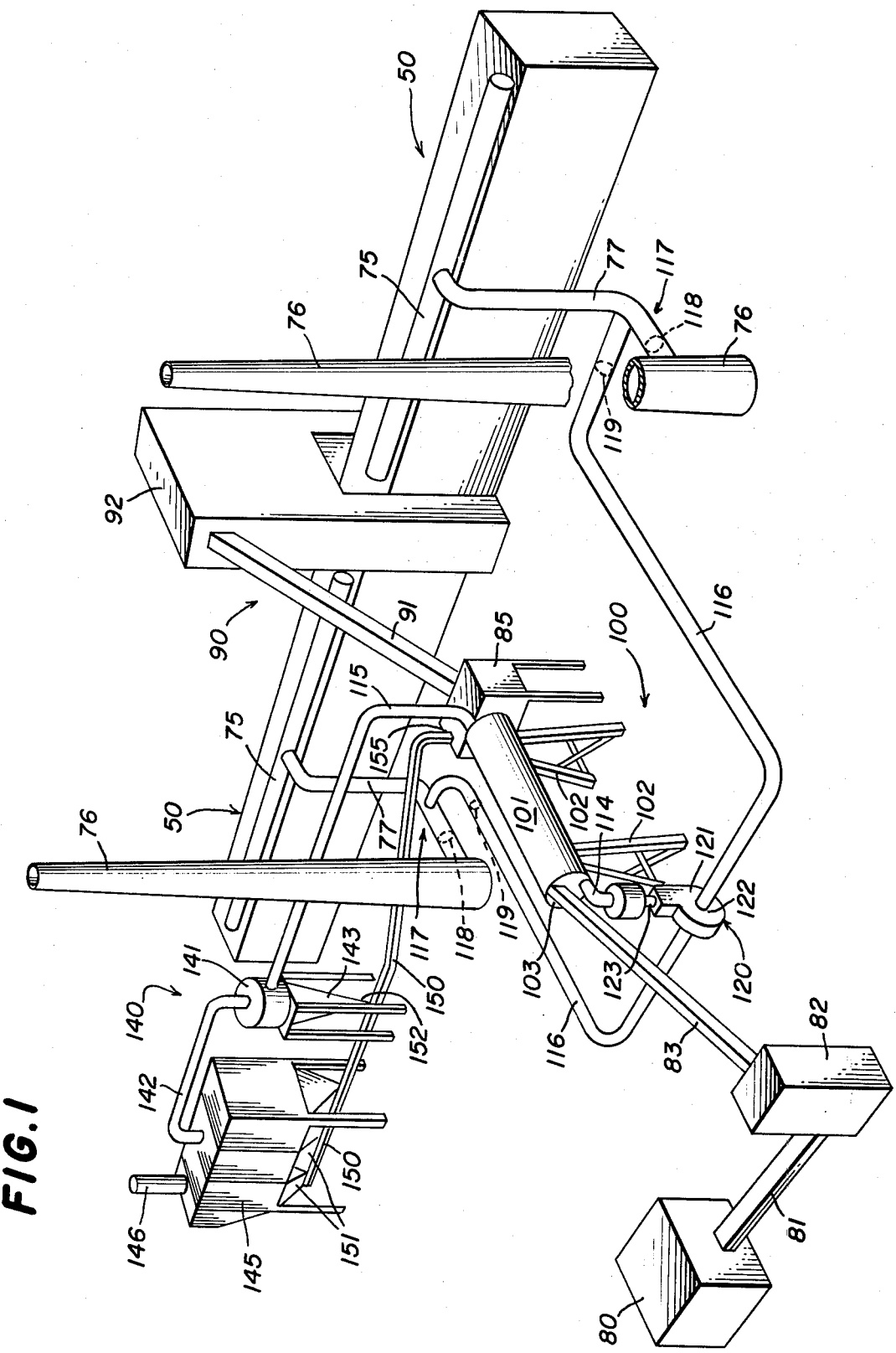
FIG. 1 is a perspective and diagrammatic view of a coke oven installation incorporating therein a first embodiment of an apparatus for partially drying and preheating coal made in accordance with and embodying the principles of the present invention.
Figure 5:
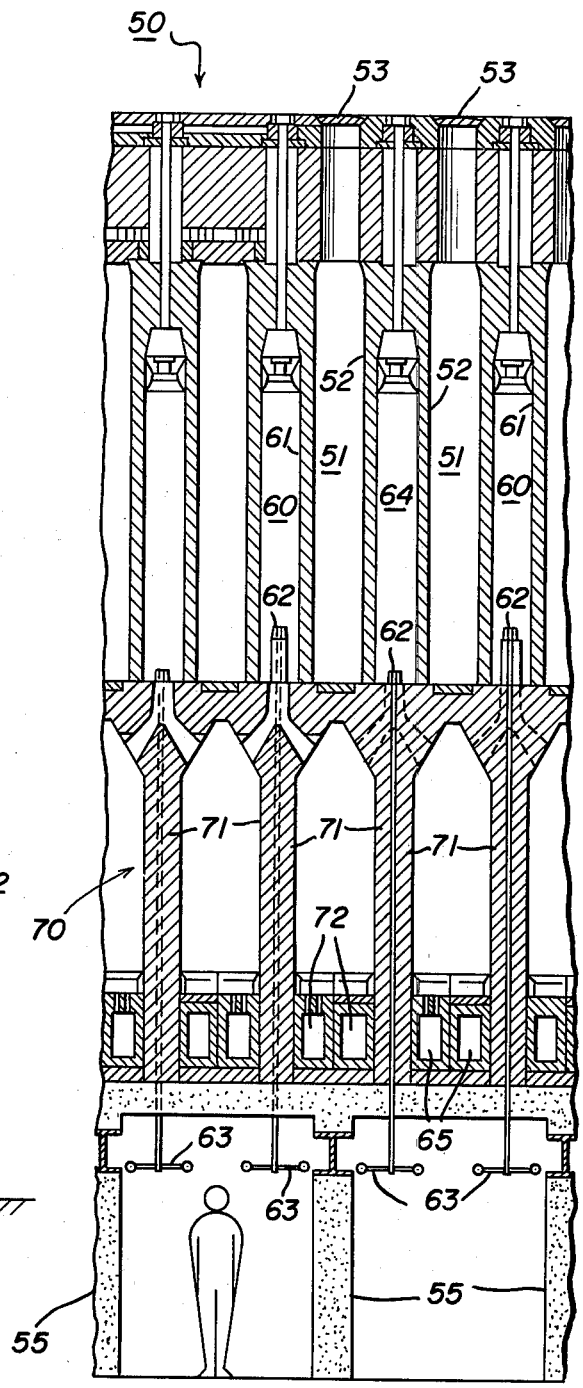
FIG. 5 is a fragmentary view in vertical section through a typical bank of coke ovens with which the apparatus for partially drying and preheating coal of the present invention can be advantageously utilized.

There is illustrated in FIG. 1 of the drawings, a set of batteries 50 of coke ovens having associated therewith and operatively connected thereto a first embodiment of an apparatus 100 for partially drying and preheating coal made in accordance with and embodying the principles of the present invention. As illustrated, the coke ovens in each of the batteries 50 are of the by-product type useful in making metallurgical coke. Referring to FIG. 5 of the drawings, there is illustrated a view in vertical transverse section through a battery 50 of coke ovens illustrating the internal construction thereof including a plurality of coking chambers 51 of the slot type having walls 52 formed of refractory brick. The bottom of the coking chambers 51 are supported by a foundation 55 and the upper ends are covered by removable lids 53 providing access to the interior of the coking chambers 51 for charging coal thereinto for coking. End doors (not shown) are provided so that a pusher mechanism on adjacent tracks (such as tracks 56 in FIG. 2) can push the completed coke from the coking chambers 51, all as is well understood within the art.

Associated with the coking chambers 51, and in heat transfer relationship thereto, are combustion chambers 60, the combustion chambers 60 being defined by walls 61 formed of refractory brick. Disposed at the bottoms of the combustion chambers 60 are burners 62 for fuel provided through fuel lines 63, the combustion chambers communicating with flues so that the combustion gases or flue gases may be removed therefrom. Air for the combustion chambers 60 is provided through air inlets 65. Heat exchangers 70 in the form of regenerator structure including walls 71 formed of refractory brick are provided below the coking chambers 51 and the combustion chambers 60 for the purpose of preheating the air used for combustion using the flue gases exiting from the combustion chambers 60, the flue gases exiting from the combustion chambers 60 being at a high temperature in the range from about 1200° F. to about 1500° F. In the heat exchangers 70, the high temperature flue gases have the temperatures thereof reduced to the intermediate temperature range of from about 450° F. to about 750° F., and the intermediate temperature flue gases exit through passages 72 and are collected in manifolds 75 (see FIG. 1). As illustrated, two chimneys 76 are provided respectively connected by first pipes 77 to one of the manifolds 75 so that the intermediate temperature flue gases can be readily vented to the atmosphere at an elevated height.

The battery 50 of coke ovens just described is a typical commercial installation to produce from coal metallurgical coke with the collection of by-products by apparatus not shown. In such prior systems, it has been customary to provide a coal crusher such as the coal crusher 80 diagrammatically illustrated in FIG. 1 which receives lump coal and crushes or pulverizes coal to a consistency useful in the coke ovens of the batteries 50. The crushed and pulverized coal is conveyed by a horizontal conveyor 81 to a surge bin 82, and in the prior art, it is thereafter conveyed by a conveyor 83 directly to a coal oiler 85, where a quantity of oil is mixed with the crushed coal. The output from the coal oiler 85 is connected by a coal transport system 90 including a conveyor 91 to a storage bin 92 disposed above the batteries 50 of the coke ovens. In a typical installation, a larry car (not shown) distributes the pulverized and oiled coal from the storage bin 92 to the individual coking chambers 51 in the batteries 50 of coke ovens.

In accordance with the present invention, there is interposed between the surge bin 82 and its outlet conveyor 83 and the input to the coal oiler 85 an apparatus for partially drying and preheating the pulverized coal, that apparatus being generally designated by the numeral 100. The apparatus 100 includes a coal dryer 101 of the indirect-direct kiln type supported at an elevated position by a frame 102. The coal dryer 101 has a wet coal inlet 103 at the end thereof disposed to the left in FIG. 1 and an outlet communicating directly with the input to the coal oiler 85.

The heating medium to partially dry and preheat the coal in the dryer 100 is derived from intermediate temperature flue gases that are supplied to the coal dryer 101 through an inlet pipe 114, and the low temperature flue gases exiting from the coal dryer 101 after heat exchange with the wet coal within the coal dryer 101 are collected in an outlet pipe 115. The intermediate temperature flue gases fed to the inlet pipe 114 are derived from the pipes 77 interconnecting the flue gas manifolds 75 and the respective chimneys 76, and more specifically, pipes 116 are connected to the pipes 77 and converge upon and are connected to flow and combustion control equipment 120. In order to control the quantity of the intermediate temperature flue gases entering the pipes 116, each of the pipes 116 and the associated pipe 77 is provided with valve mechanism 117 including a valve 118 adjacent to the associated chimney 76 and a valve 119 in the associated pipe 116. The valves 118 and 119 are of the diverter type, i.e., are regulated gate valves, and are operative to divert a portion, or if necessary, all of the intermediate temperature flue gases in the pipes 77 to the associated pipes 116.

The flow and combustion equipment 120 includes a fan or blower 121 having inlets 112 connected to the pipes 116, respectively, and an outlet 123 connected to the pipe 114 that feeds the intermediate temperature flue gases into the coal dryer 101. The fan 121 assures that sufficient pressure is provided so that the apparatus 100 for partially drying and preheating the coal works as intended and so that the low temperature flue gases have sufficient pressure to flow through the apparatus 100 and satisfactorily into the atmosphere.

Within the coal dryer 101, the intermediate temperature flue gases from the inlet pipe 114 are in heat transfer relation with the wet coal entering the coal dryer 101 through the wet coal inlet 103. The intermediate temperature flue gases usually have a temperature in the range from about 450° F. to about 750° F., and after passage through the coal dryer 101 the flue gases emerge at a low temperature in the range from about 140° F. to about 200° F. The wet coal at the inlet 103 is typically at ambient temperature, i.e., the temperature of the outdoors which may vary from minus 20° F. to as high as 100° F., and may contain typically 6% by weight of moisture, but may have up to as much as 13% by weight moisture or more. The coal dryer 101 in cooperation with the valve mechanisms 117 are operated so as to dry the coal to a moisture content in the range from about 2% by weight to about 5% by weight and to preheat the coal to a temperature in the range from about 130° F. to about 190° F.

The partially dried and preheated coal exiting from the coal dryer 101 is fed directly into the coal oiler 85 where typically about 1 gallon of oil is added to each ton of pulverized coal. In general, sufficient oil is added so that the oil comprises from about 0.05% to about 1.5% by weight of the oiled pulverized coal. The oiled pulverized coal is then conveyed by the coal transport system 90, specifically through the conveyor 91, to the storage bin 92 where it is stored until it is time to be distributed into the individual coking chambers 51 for the coking thereof.

The low temperature flue gas outlet pipe 115 exiting from the coal dryer 101 is connected as the input to a gas cleaner system 140 disposed to the left in FIG. 1.

The gas cleaner system 140 includes a cyclone separator 141, the separated air being conveyed away by an air pipe 142, and the solid materials removed by the cyclone separator 141 being conveyed downwardly under the influence of gravity into a cone 143. The air pipe 142 is connected to an inlet to a bag filter system 145 where the entrained coal fines are filtered out, and the now completely filtered air stream exits through an outlet pipe 146 to the atmosphere. It is noted that the fan 121 provides additional energy for moving the flue gases at a velocity to assure adequate dispersal of the low temperature flue gases after filtering by the gas cleaner system 140 into the atmosphere through the outlet pipe 146.

The small particulate coal fines removed by the gas cleaner system 140 are conveyed back to the oiler 85 by a coal fines conveyor 150. The conveyor 150 picks up the very fine coal from an input 151 at the bag filter system and also receives coal dust from the cone 143 through a cyclone input 152, the collected and combined fines from the cyclone separator 141 and the bag filter system 145 being conveyed to an outlet 155 for the coal fines conveyor 150 at the coal oiler 85. The described gas cleaner system 140 insures that the low temperature flue gases issuing from the outlet pipe 146 meet environmental standards for particulate matter content so as to maintain the environment in a clean condition.

The oiled coal from the coal oiler 85 also can be handled without pollution of the surrounding environment since the oil retains all of the fines of the ground coal so that there is essentially no discharge of particulate matter from the coal transport system 90 including the emptying of the pulverized oiled coal into the coking chambers 51.

It is pointed out that the apparatus 100 for partially drying and preheating the ground coal has been designed as an addition to a standard battery 50 of coke ovens and the attendant support equipment, and can be readily added thereto by retrofitting at a very economical cost, the estimated cost of retrofitting an existing set of batteries 50 of coke ovens being in the order magnitude of $4,000,000, whereas the complete rebuilding of sets of battieres 50 of coke ovens to provide coal drying and preheating would cost about $40,000,000.

It further is pointed out that the apparatus 100 for partially drying and preheating coal accomplishes the partial drying and preheating using what is essentially waste energy from the intermediate temperature flue gases issuing from the combustion chambers 60 through the manifolds 75 and the pipes 77. This is heat which is ordinarily lost by passage of the intermediate temperature flue gases upwardly through the associated chimneys 76. By utilizing the heat in the intermediate temperature flue gases to partially dry and preheat the coal, substantial fuel savings are achieved in the overall operation of the set of batteries 50 of coke ovens illustrated in FIG. 1. This reduction in the fuel requirements results from the reduction in the moisture of the coal fed to the coking chambers 51.

As a result of the partial drying and preheating of the coal at a given pulverization level, the bulk density of the coal increases, and this allows the capacity of each coking chamber to be increased since a greater weight of oiled pulverized coal can be charged thereinto. There also is an improvement in coke strength for a given coal blend that is obtained by partially drying and preheating the coal. There further is a resultant increase in furnace coke yield and a decrease in coke fines generated for a given coal blend and degree of pulverization as a result of partially drying and preheating the coal. Finally, there is also provided the opportunity of utilizing greater proportions of marginal coking coals in the blend of coals fed to the coal crusher 80 without impairing coke quality, if desired.

Summarizing, the oiled pulverized coal issuing from the apparatus 100 for partially drying and preheating coal of the present invention has the correct bulk density, flowability and consistency to enable duct-free charging of the coal through the conventional coal bin 92 and associated larry cars to the coking chambers 51. This highly desirable characteristic of the pulverized coal is accomplished by utilizing what is essentially waste heat in the intermediate temperature flue gases from the regenerative heat exchangers 70 in the batteries 50 of coke ovens, combined with the customary oiling of the pulverized coal in the coal oiler 85. There results substantial fuel savings, increased coke oven productivity and improved coke quality, or conversely the ability to utilize marginal coking coals. The apparatus 100 of the present invention can be incorporated in new installations, but can also be used to retrofit existing batteries 50 of coke ovens since the apparatus 100 is simply interposed between the pulverized coal surge bin 82 and the coal oiler 85 and acquires its primary heating source by tapping into the intermediate temperature flue gases before introduction thereof into the associated chimneys.

Since the coal dryer 101 does not dry the pulverized coal to a bone-dry condition, but always retains from about 2% by weight to about 5% by weight moisture therein, there is no hazard from fine coal dust in the coal dryer 101 or in the coal oiler 85. Therefore, it is not necessary to utilize special precautions to prevent explosion of coal dust, such as the use of an inert atmosphere, as is necessary in many of the prior art devices.

Figure 2:
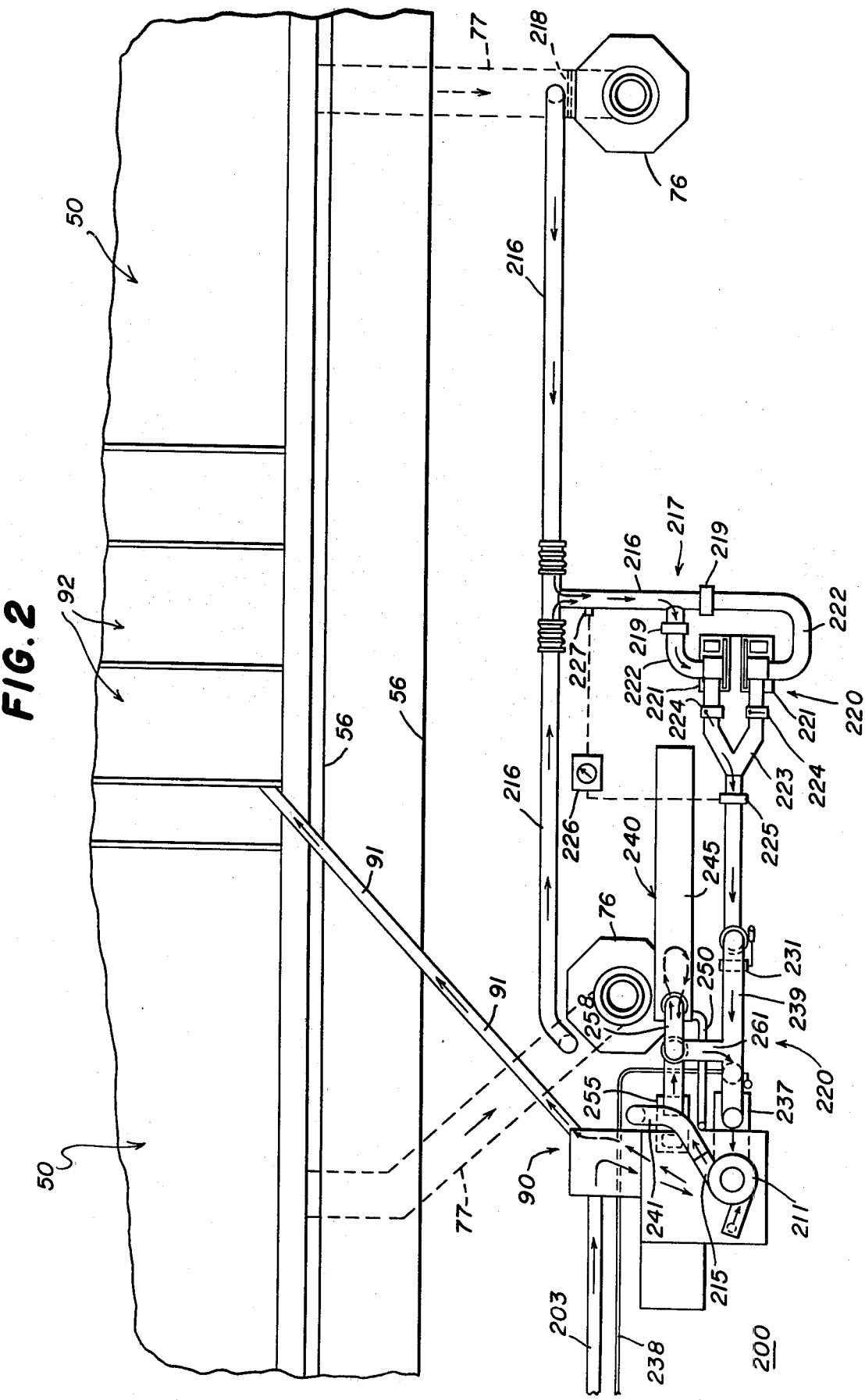
FIG. 2 is a plan view, partly diagrammatic, of a coke oven incorporating therein a second embodiment of an apparatus for partially drying and preheating coal made in accordance with and embodying the principles of the present invention.
Figure 3:
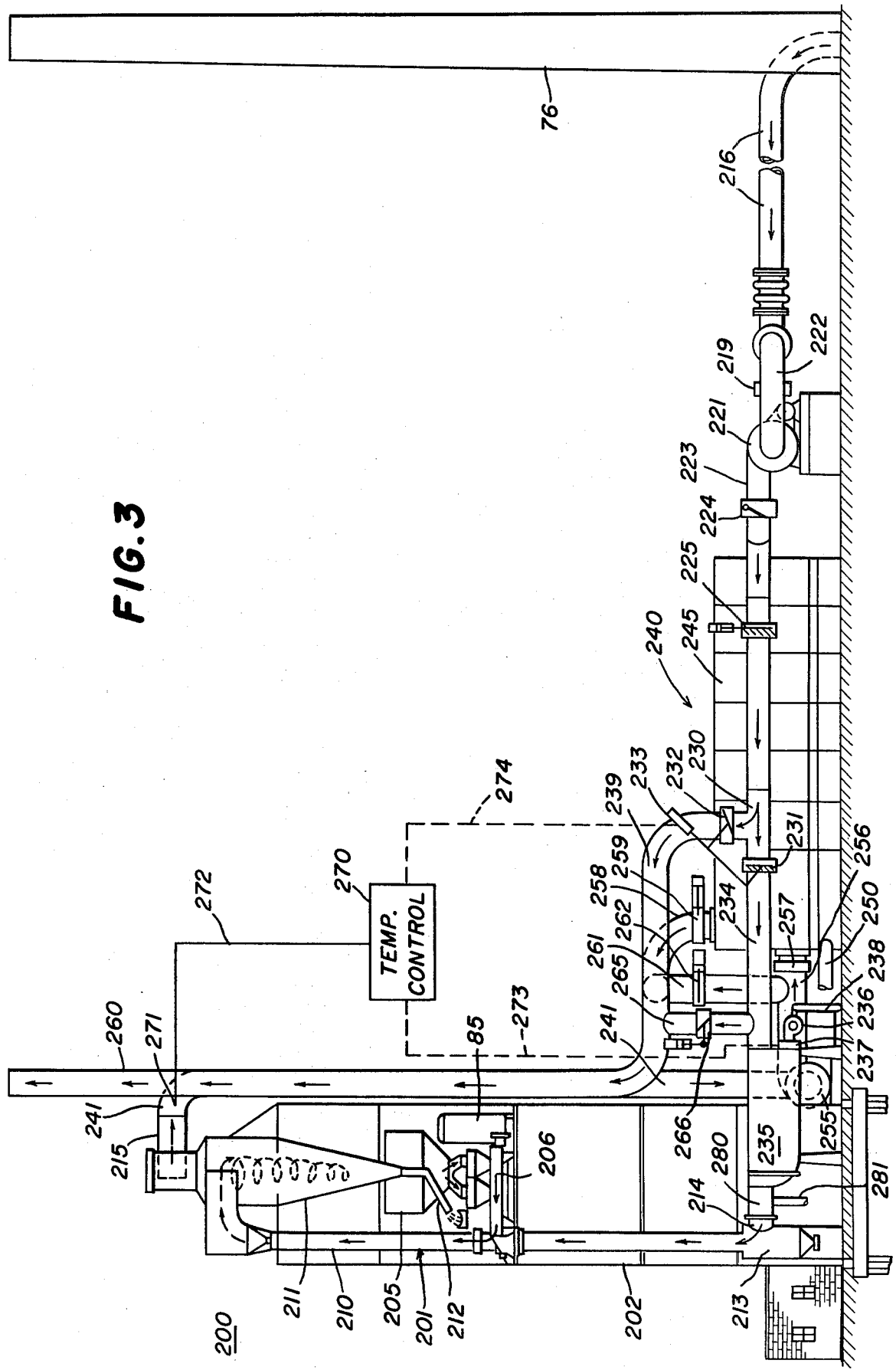
FIG. 3 is a side elevational view of the apparatus of FIG. 2.
Figure 4:
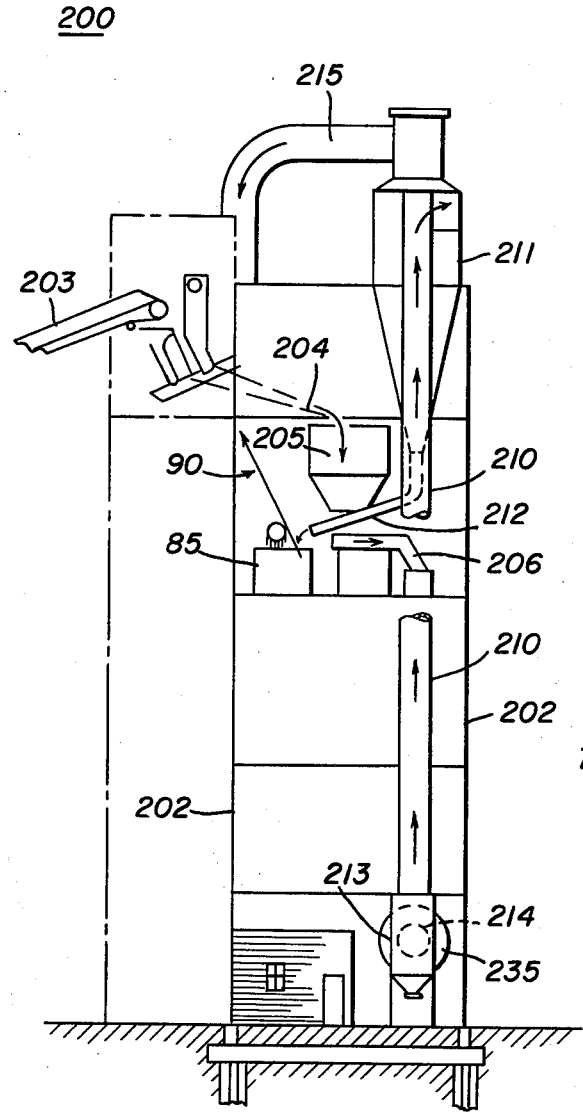
FIG. 4 is an end view as viewed from the left of the apparatus of FIGS. 2 and 3.

There is illustrated in FIGS. 2, 3 and 4 of the drawings a second preferred embodiment of an apparatus 200 for partially drying and preheating coal made in accordance with and embodying the principles of the present invention. The apparatus 200 has been shown connected to batteries 50 of coke ovens, the batteries 50 of coke ovens including the coking chambers 51, the combustion chambers 60 and the heat exchangers 70 as well as the auxiliary equipment including the coal crusher 80 and the coal oiler 85 and the coal transportation system 90 identical to the like numbered parts in the batteries 50 of coke ovens described above in association with the apparatus 100 for partially drying and preheating coal illustrated in FIGS. 1 and 5 of the drawings. Accordingly, these parts will not be further described at this point.

The apparatus 200 includes a coal dryer 201 of the flash-drying type mounted on a frame 202, and including a vertical drying column 210 connecting at the upper end thereof with a cyclone separator 211. Wet pulverized coal is conveyed by a conveyor 203 (see FIGS. 2 and 4) to an inlet 204 to a surge bin 205, the surge bin 205 emptying into a wet coal mixer and feeder 206. The feeder 206 feeds the pulverized wet coal into the drying column 210 of the coal dryer 201 intermediate the ends thereof, the lower end of the column 210 terminating in a pulverized coal collection chamber 213 and also having an intermediate temperature flue gas inlet pipe 214 connected thereto. The upper end of the column 210 exits into the upper end of the cyclone separator 211, the partially dried and preheated coal falling downwardly through the separator 211 and through an outlet 212 and into the associated coal oiler 85 from which it is carried by the coal transport system 90 which serves to convey the partially dried and preheated coal by a conveyor 91 to storage bins 92.

The intermediate temperature flue gases used in the coal dryer 201 are derived from pipes 216 that connect respectively to pipes 77 from the manifolds of associated batteries 50 of coke ovens, the pipes 216 being connected to the associated pipes 77 adjacent to the respective chimneys 76, all of the pipes 216 being joined and connected as the input to flow and combustion equipment generally designated by the numeral 220 including two fans 221 connecting to a joint outlet 223 provided with individual check valves 224 and a damper 225. Flow through the pipes 216 to the fans 221 is controlled by valve mechanism 217 including a valve or damper 218 at the entry to each of the chimneys 76 and shut-off valves 219 connected to inlet pipes 222 for the fans 221. In the normal operation of the apparatus 200, only one of the fans 221 is ordinarily operating, the valves 219 and 224 being adjusted so as to direct the flow of intermediate temperature flue gases from the inlet pipe 216 to the fan 221 that is in operation. The damper 225 is under the control of a draft controller 226 which has a sensor 227 in the pipe 216 so as to control the damper 225 in accordance with the conditions of the intermediate temperature flue gases in the pipe 216.

The downstream side of the damper 225 is connected to a flue gas control tee 230 (see FIG. 3 particularly) having valves or dampers 231 and 232 in the outlet therefrom, the damper 231 controlling the flow to a pipe 234 and the damper 232 controlling the flow to a pipe 239. A common control mechanism 233 controls both of the dampers 231 and 232 so as to apportion the stream of intermediate temperature flue gases between the pipes 234 and 239. The pipe 234 connects with the input to an auxiliary air heater 235 that is provided with a blower 236 and a burner 237 having a fuel line 238, the auxiliary air heater 235 being useful to heat the intermediate temperature flue gases from the normal temperature in the range from 450° F. to 750° F. to a temperature up to as high as about 1000° F. when the moisture content of the wet coal coming from the wet coal conveyor 203 is above about 8% by weight, thus to assure the proper partial drying and preheating of the pulverized coal. The outlet of the air heater 235 connects to the inlet pipe 214 at the bottom of the coal dryer column 210 so as to introduce the intermediate temperature flue gases into the column 210, the flue gases rising upwardly through the column 210 as illustrated by the arrows and heating the stream of wet pulverized coal from the feeder 206. The intermediate temperature flue gases in the column 210 carry the pulverized coal upwardly and into the cyclone separator 211, and in doing so partially dry the coal to a moisture content in the range from about 2% by weight to about 5% by weight and preheat the coal to a temperature in the range from about 130° F. to about 190° F.

The low temperature flue gases at the outlet pipe 215 from the cyclone separator 211 contain a certain amount of coal fines, and accordingly the low temperature flue gases from the outlet 215 are conveyed by a pipe 241 to a gas cleaner system 240 that includes a bag filter house 245. More specifically, the pipe 241 connects into the input to a vent fan 255 which has the outlet thereof connected by a pipe 256 to the inlet to the bag filter house 245; an outlet from the bag filter house 245 is through a pipe 258 having a control valve 259 therein. The low temperature flue gases exit from the bag filter house 245 through the outlet pipe 258 to a pipe 260 that is vented to the atmosphere. If desired, the low temperature flue gas stream in the inlet pipe 256 can be by-passed around the bag filter house 245 by means of a bag house by-pass pipe 261 having a control valve 262 therein. There also is a by-pass pipe 265 interconnecting the pipe 234 and the vent pipe 260, the pipe 265 having a control valve 266 therein.

The common control mechanism 233 for the dampers 231 and 232 as well as the blower 236 for the auxiliary air heater 235 are under the control of a temperature controller 270 having a sensor 271 in the pipe 241 connecting the air outlet from the coal dryer 201, specifically the cyclone separator 211, to the vent fan 255. The temperature controller 270 serves through linkage 274 to operate the dampers 231 and 232 so as to by-pass sufficient amount of the intermediate temperature flue gases directly to the vent pipe 260 so as to maintain the temperature of the exit low temperature flue gases at the sensor 271 within the desired range of from about 140° F. to about 200° F. If a full opening of the damper 231 accompanied by the full closing of the damper 232 still results in an insufficient temperature at the sensor 271, then the auxiliary air heater 235 is actuaged through linkage 273 so as to increase the temperature of the intermediate flue gases entering the bottom of the drying column 210 to a temperature as high as 1000° F. A demand for temperatures of this magnitude is occasioned by a water content in the wet pulverized coal of above about 8% by weight thereof.

There also is provided in the apparatus 200 protection for the coal dryer 201 and the gas cleaner system 240, and particularly the bag filter house 245, when a loss of wet coal feed from the conveyor 203 is encountered. Loss of the wet coal feed from the conveyor 203 would cause the temperature within the coal dryer 201, including the column 210 and the cyclone separator 211, and within the bag filter house 245 to rise to an undesirable level, even with the dampers 231 and 232 in their most extreme positions. Accordingly, a water spray apparatus 280 has been provided between the auxiliary air heater 235 and the intermediate temperature flue gas inlet pipe 214 so as to spray water thereinto and cool the intermediate temperature flue gases to a safe cool temperature. A water line 281 provides the necessary water to the water spray apparatus 280 for the described purpose.

In the operation of the apparatus 200, the battery 50 of the coke ovens is continuously operating and therefor there are available in the pipes 77 intermediate temperature flue gases at a temperature in the range from about 450° F. to about 750° F. The valve mechanism 217 is actuated so as to at least partially close the dampers 218 and to open the appropriate one of the valves 219 so as to feed the intermediate temperature flue gases to the selected blower 221. The check valve 224 of the appropriate blower 221 is open, and the damper 225 is opened by the draft controller 226 since the sensor 227 will detect conditions in the intermediate temperature flue gases sufficient to warrant operation of the apparatus 200. The dampers 231 and 232 will be positioned through the linkage 274 by the temperature controlled 270 in accordance with the temperature of the low temperature flue gases exiting through the pipe 241. Likewise, the temperature controller 270 through the linkage 273 will turn on the auxiliary air heater 235 if there is sufficient moisture in the wet coal, i.e., above about 8% by weight, so as to require auxiliary heat in the intermediate temperature flue gas, i.e., a temperature above the normal temperature in the range 450° F. to 750° F., and perhaps as high as 1000° F., in order to dry the coal to the desired moisture content and heat the coal to the desired temperature range. It is noted that it is desired to keep the temperature of the low temperature flue gases in the range from about 140° F. to about 200° F.

The wet pulverized coal from the feeder 206 enters the drying column 210 and meets the upwardly surging intermediate temperature flue gases therein and is carried thereby in heat exchange relation so as to partially dry the coal to a water content in the range from about 2% by weight to about 5% by weight and to heat the coal to a temperature in the range from about 130° F. to about 190° F. The now low temperature flue gases carrying the partially dried and preheated pulverized coal flow into the cyclone separator 211, where the pulverized coal is separated and fed from the outlet 212 to the oiler 85, while the low temperature flue gases exit through the outlet pipe 215 and into the pipe 241 under the urging of the vent fan 255 and then into the gas cleaner system 240, including the bag filter house 245. Any fines or other entrained particulate matter in the low temperature flue gas stream are removed in the bag filter house 245 and returned by the fines conduit 250 to the oiler 85. The cleaned low temperature flue gas stream flows upwardly through the outlet pipe 258 and into the vent pipe 260 for discharge to the atmosphere. It is noted that the low temperature flue gases are essentially free of all particulate matter, whereby to protect the surrounding environment.

It is pointed out that the method for partially drying and preheating pulverized coal utilized in apparatus 100 and in apparatus 200 is the same. More specifically, intermediate temperature flue gases in the temperature range from about 450° F. to about 750° F. from the regenerative heat exchangers in the coke ovens are at least partially diverted from the chimneys and utilized in a coal dryer to reduce the moisture content of the coal to the range of from about 2% by weight to about 5% by weight and to raise the temperature of the coal into the range of from about 130° F. to about 190° F. Although two different types of coal dryers have been illustrated, it will be understood that other types of coal dryers may be utilized, providing that the operating parameters are maintained the same. The use of intermediate temperature flue gases to partially dry and preheat the pulverized coal result in the reduction of the temperature of the flue gases to a low temperature in the range of about 140° F. to about 200° F. This necessitates the use of a vent fan or blower to assure that enough draft is provided for ready exit of the low temperature flue gases to the atmosphere. Furthermore, the low temperature flue gases are thoroughly cleaned of particulate matter before discharge to the atmosphere by a gas cleaner system in both apparatus 100 and apparatus 200.

As explained above with respect to apparatus 100, apparatus 200 provides partially dried and preheated pulverized coal in an oiled condition so as to permit operation of the associated battery 50 of coke ovens with overall fuel savings, with increased oven productivity and with improved coke quality. It further is pointed out that the apparatus 200 also may be used to retrofit existing batteries 50 of coke ovens, as well as being incorporated as part of new coke oven installations. More specifically, the apparatus 200 provides all of the benefits and desirable results outlined above with respect to the apparatus 100.

While there have been described what are at present considered to be the preferred embodiments of the invention, it will be understood that various modifications may be made therein, and it is intended to cover in the appended claims all such modifications that fall within the true spirit and scope of the invention.

What is claimed is:

1. In a coke oven including a coking chamber, a combustion chamber in heat transfer relation to the coking chamber and having a fuel inlet and a heated air inlet and a high temperature flue gas outlet, a heat exchanger associated with the combustion chamber including a cold air inlet and a heated air outlet communicating with the heated air inlet and a high temperature flue gas inlet communicating with the high temperature flue gas outlet and an intermediate temperature flue gas outlet, the heat exchanger heating the inlet air using the energy in the high temperature flue gases to provide heated air for the combustion chamber and cooling the high temperature flue gases to an intermediate temperature, a chimney having the lower end thereof connected by a conduit to the intermediate temperature flue gas outlet, and coal transport mechanism for conveying coal to the coking chamber; apparatus for preheating and partially drying coal comprising a coal dryer having an inlet for wet coal and an outlet for partially dried and preheated coal and an inlet for intermediate temperature flue gases and an outlet for low temperature flue gases, a pipe interconnecting the conduit and said inlet for intermediate temperature flue gases, sensing means coupled to said outlet for low temperature flue gases for sensing the temperature of the flue gases leaving said coal dryer, valve mechanism associated with the conduit and said pipe for diverting at least a portion of the intermediate temperature flue gases to said coal dryer, the flue gases in said coal dryer being in heat exchange relation with the wet coal in said coal dryer partially to dry the coal to a water content of a few percent by weight and to preheat the coal to a temperature below the boiling point of water, a supplemental heater in heat exchange relationship with the intermediate temperature flue gases in said pipe for increasing the temperature of the intermediate temperature flue gases when the moisture content of the wet coal at the coal inlet to said coal dryer is above about 8% by weight, and control mechanism connected to said sensing means and to said valve mechanism and to said supplemental heater responsive to the temperature of the gases leaving said coal dryer for controlling the amount of intermediate temperature flue gas diverted to said coal dryer and the operation of said supplemental heater, said control mechanism operating said valve mechanism to increase the amount of the intermediate temperature flue gases diverted to said coal dryer when the temperature of said low temperature flue gases leaving said coal dryer is below a predetermined temperature range and to decrease the amount of intermediate temperature flue gases diverted to said coal dryer when the temperature of said low temperature flue gases leaving said coal dryer is above said predetermined temperature range, said control mechanism actuating said supplemental heater in response to a temperature of the flue gases leaving said coal dryer above said predetermined temperature range when said valve mechanism is in a condition for diverting substantially all of said intermediate flue gases to said coal dryer, the coal transport mechanism conveying the partially dried and preheated coal to the coking chamber for the coking thereof to produce coke with a high stability index at a fuel savings with high coking productivity.

2. The apparatus for preheating and partially drying coal set forth in claim 1, wherein said supplemental heater has a capacity to raise the temperature of the intermediate temperature flue gases to about 1,000° F.

3. The apparatus for preheating and partially drying coal set forth in claim 1, and further comprising apparatus for spraying water into said pipe in response to the loss of feeding of wet coal to said coal dryer to reduce the flue gas temperature to a low temperature.

4. The apparatus for preheating and partially drying coal set forth in claim 1, wherein said coal dryer is a indirect-direct kiln dryer.

5. The apparatus for preheating and partially drying coal set forth in claim 1, wherein said coal dryer is a flash drying column.

6. The apparatus for preheating and partially drying coal set forth in claim 1, and further comprising a fan in said second pipe to increase the air pressure therein to assure the expelling of the low temperature flue gas to the atmosphere.

7. The apparatus for preheating and partially drying coal set forth in claim 1, and further comprising a coal oiler having the input thereto receiving the partially dried and preheated coal from said coal dryer outlet, the outlet of said coal oiler delivering oiled coal to the coal transport mechanism.

8. In a coke oven including a coking chamber, a combustion chamber in heat transfer relation to the coking chamber and having a fuel inlet and a heated air inlet and a high temperature flue gas outlet, a heat exchanger associated with the combustion chamber including a cold air inlet and a heated air outlet communicating with the heated air inlet and a high temperature flue gas inlet communicating with the high temperature flue gas outlet and an intermediate temperature flue gas outlet, the heat exchanger heating the inlet air using the energy in the high temperature flue gases to provide heated air for the combustion chamber and cooling the high temperature flue gases to an intermediate temperature, a chimney having the lower end thereof connected by a conduit to the intermediate temperature flue gas outlet, coal transport mechanism for conveying coal to the coking chamber, and a coal oiler at the input to the coal transport mechanism for adding oil to the coal prior to transport thereby; apparatus for preheating and partially drying coal comprising a coal dryer of the flash drying type having an inlet for wet coal and an outlet for partially dried and preheated coal and an inlet for intermediate temperature flue gases and an outlet for low temperature flue gases, a pipe interconnecting the conduit and said inlet for intermediate temperature flue gases, sensing means coupled to said outlet for low temperature flue gases for sensing the temperature of the flue gases leaving said coal dryer, valve mechanism associated with the conduit and said pipe for diverting at least a portion of the intermediate temperature flue gases to said coal dryer, the flue gases in said coal dryer being in heat exchange relation with the wet coal in said coal dryer partially to dry the coal to a water content of a few percent by weight and to preheat the coal to a temperature below the boiling point of water, a gas cleaner system for removing particulate matter from the low temperature flue gases and having an inlet connected to said coal dryer outlet for low temperature flue gases and an outlet communicating with the atmosphere, a supplemental heater in heat exchange relationship with the intermediate flue gases in said pipe for increasing the temperature of the intermediate flue gases when the moisture content of the wet coal at the coal inlet to said coal dryer is above about 8% by weight, and control mechanism connected to said sensing means and to said valve mechanism and to said supplemental heater responsive to the temperature of the gases leaving said coal dryer for controlling the amount of intermediate temperature flue gas diverted to said coal dryer and the operation of said supplemental heater, said control mechanism operating said valve mechanism to increase the amount of the intermediate temperature flue gases diverted to said coal dryer when the temperature of said low temperature flue gases leaving said coal dryer is below a predetermined temperature range and to decrease the amount of intermediate temperature flue gases diverted to said coal dryer when the temperature of said low temperature flue gases leaving said coal dryer is above said predetermined temperature range, said control mechanism actuating said supplemental heater in response to a temperature of the flue gases leaving said coal dryer above said predetermined temperature range when said valve mechanism is in a condition for diverting substantially all of said intermediate flue gases to said coal dryer, the coal oiler receiving the partially dried and preheated coal from said coal dryer and the coal transport mechanism conveying the oiled partially dried and preheated coal to the coking chamber for the coking thereof to produce coke with a high stability index at a fuel savings with high coke productivity.

9. The apparatus for preheating and partially drying coal set forth in claim 8, and further comprising a fan in said pipe to increase the air pressure therein to assure the expelling of the low temperature flue gases to the atmosphere.

10. The apparatus for preheating and partially drying coal set forth in claim 8, and further comprising conveyor mechanism for returning the particulate matter from said gas cleaner system to the outlet of said coal dryer for partially dried and preheated coal and adding said particulate matter thereto.

11. The apparatus for preheating and partially drying coal set forth in claim 8, and further comprising apparatus for spraying water into said second pipe in response to the loss of feeding of wet coal to said coal dryer to reduce the flue gases temperature to a low temperature.

* * * * *